United States Patent
Lin et al.

(10) Patent No.: US 7,228,368 B2
(45) Date of Patent: Jun. 5, 2007

(54) POLLING-BASED APPARATUS AND SYSTEM GUARANTEEING QUALITY OF SERVICE

(75) Inventors: Chu-Ming Lin, Hsinchu (TW); Shih-Chung Yin, Hsinchu (TW)

(73) Assignee: Mediatek, Inc., Hsinchu (TW)

( * ) Notice: Subject to any disclaimer, the term of this patent is extended or adjusted under 35 U.S.C. 154(b) by 407 days.

(21) Appl. No.: 10/864,200

(22) Filed: Jun. 9, 2004

(65) Prior Publication Data

US 2005/0278470 A1 Dec. 15, 2005

(51) Int. Cl.
*G06F 13/36* (2006.01)

(52) U.S. Cl. .......................... 710/38; 710/36; 710/52; 710/53; 710/105; 710/110; 710/241; 710/309; 370/362

(58) Field of Classification Search ................ 710/36, 710/38, 52, 53, 110, 241, 309, 105; 370/362
See application file for complete search history.

(56) References Cited

U.S. PATENT DOCUMENTS 6,662,306 B2 * 12/2003 Van Loo ................. 713/600
2005/0157709 A1 * 7/2005 Lin ......................... 370/362

* cited by examiner

*Primary Examiner*—Tammara Peyton
(74) *Attorney, Agent, or Firm*—Thomas, Kayden, Horstemeyer & Risley

(57) ABSTRACT

A polling-based communication apparatus and system. The apparatus of the invention, connected to a host computer through a peripheral bus, comprises an arbiter and multiple addressable entities. Each addressable entity corresponds to one of queues maintained in the host computer. The arbiter can determine which queue is to be served next in accordance with a quality of serve policy. The host computer polls each addressable entity by issuing a query packet. Depending on the queue chosen to be served next, the arbiter grants the corresponding addressable entity access to the peripheral bus, causing this granted addressable entity to respond to the host computer's polling with an acknowledgement packet. Thus the host computer initiates transactions to transfer data packets from the chosen queue through the peripheral bus to the corresponding addressable entity.

17 Claims, 3 Drawing Sheets

POLLING-BASED APPARATUS AND SYSTEM GUARANTEEING QUALITY OF SERVICE

BACKGROUND

1. Field of the Invention

The invention relates to the art of communication systems, and more particularly to a polling-based scheme for guaranteeing quality of service communication by serving multiple queues in a host system without using direct memory access (DMA).

2. Description of the Related Art

With the convergence of communication and computing technology, processing platforms have been integrated with communication systems to provide enhanced service features and resource allocation. Such a processing platform is typically coupled to a communication network and hosts several processes for transmitting data to or receiving data from nodes on the communication network. A processing platform may be configured to allocate resources to provide a quality of service (QoS) for a particular communication service supported by the processing platform.

A processing platform integrated as part of a communication system may include a peripheral device coupled to a communication medium and a host system to receive data from the peripheral device and transmit data to the communication medium through the peripheral device. A peripheral bus typically transfers data between the host system and the peripheral device. The processing platform that supports QoS and resource allocation typically uses multiple queues in which each queue is associated with a particular QoS requirement and/or a particular data flow. These queues should be effectively processed per their respective priorities, for example, to permit many data flows to be individually scheduled per their respective negotiated QoS levels.

As far as is known, most conventional peripheral devices carry out QoS guarantees over I/O buses such as the PCI bus. This type of bus may transfer data between a peripheral device and a host system using a "direct memory access (DMA)" through which data can be transferred independently of the processes hosted on the host system. In this scheme, the peripheral device is able to initiate bus transactions and is generally referred to as a bus master. In recent years, the Universal Serial Bus (USB) has become a popular standard for PC peripherals because of its versatile peripheral interconnectability. The USB provides not only ease-of-use for PC peripheral expansion but also a low-cost solution that supports transfer rates up to 480 Mb/s. However, in a USB system, all data transfers are initiated only by a USB host. USB peripherals are, in effect, bus slave devices. Little work is done to guarantee QoS for USB systems even though the USB is an industry standard. Accordingly, there is a need to provide a QoS guarantee for a bus slave device, unencumbered by the limitations associated with the related art.

SUMMARY

The present invention is generally directed to a scheme for serving multiple queues in a host system on a polling basis without using direct memory access (DMA). According to one aspect of the invention, a polling-based communication system is disclosed. The system comprises a host computer and a peripheral slave device. The host computer comprises a system memory and a peripheral bus. The system memory has multiple queues, each configured to store data packets to be transmitted. Connected to the host computer through the peripheral bus, the peripheral slave device comprises an arbiter, a plurality of addressable entities, and a first-in-first-out (FIFO) buffer. The arbiter can determine which queue within the system memory is to be served next in accordance with a quality of service policy. Each addressable entity corresponds to one of the queues and, if granted, accepts the data packets over the peripheral bus from the corresponding queue. The FIFO buffer is responsible for storing the data packets fed by the addressable entities. Furthermore, the peripheral slave device utilizes physical layer interface logic, coupled to the FIFO buffer and accepting the data packets therefrom, to prepare the data packets for transmission across a physical medium.

The host computer polls each addressable entity on the peripheral slave device by issuing a query packet, and initiates one or more transactions to transfer the data packets from one of the queues to the corresponding addressable entity that responds with an acknowledgement packet. Depending on the queue determined to be served next, the arbiter can grant the corresponding addressable entity access to the peripheral bus, causing the granted addressable entity to respond to the host computer's polling with the acknowledgement packet. The other addressable entities, not granted by the arbiter, individually respond to the host computer's polling with a negative acknowledgement packet.

According to another aspect of the invention, a polling-based communication apparatus by serving multiple queues in a host system is provided. The apparatus of the invention comprises an arbiter, a plurality of addressable entities, and a FIFO buffer. The arbiter can determine which queue within the system memory is to be served next in accordance with a quality of service policy. Each addressable entity corresponds to one of queues maintained in the host system and, if granted, accepts data packets through a peripheral bus from the corresponding queue. The FIFO buffer is responsible for storing the data packets fed by the addressable entities. Furthermore, the apparatus of the invention utilizes physical layer interface logic, coupled to the FIFO buffer and accepting the data packets therefrom, to prepare the data packets for transmission across a physical medium. In operation, each addressable entity is polled with a query packet from the host system. Depending on the queue determined to be served next, the arbiter grants the corresponding addressable entity access to the peripheral bus, causing the granted addressable entity to respond to the host system's polling with an acknowledgement packet. By one or more transactions over the peripheral bus, the addressable entity responding with the acknowledgement packet is fed with the data packets from the corresponding queue.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Reference throughout this specification to "one embodiment" or "an embodiment" indicates that a particular feature, structure, or characteristic described in connection with the embodiments is included in at least one embodiment of the present invention. Thus, the appearances of the phrase "in one embodiment" or "an embodiment" in various places throughout this specification are not necessary all referring to the same embodiment. Furthermore, the particular features, structures, or characteristics may be combined in one or more embodiments. As to the accompanying drawings, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
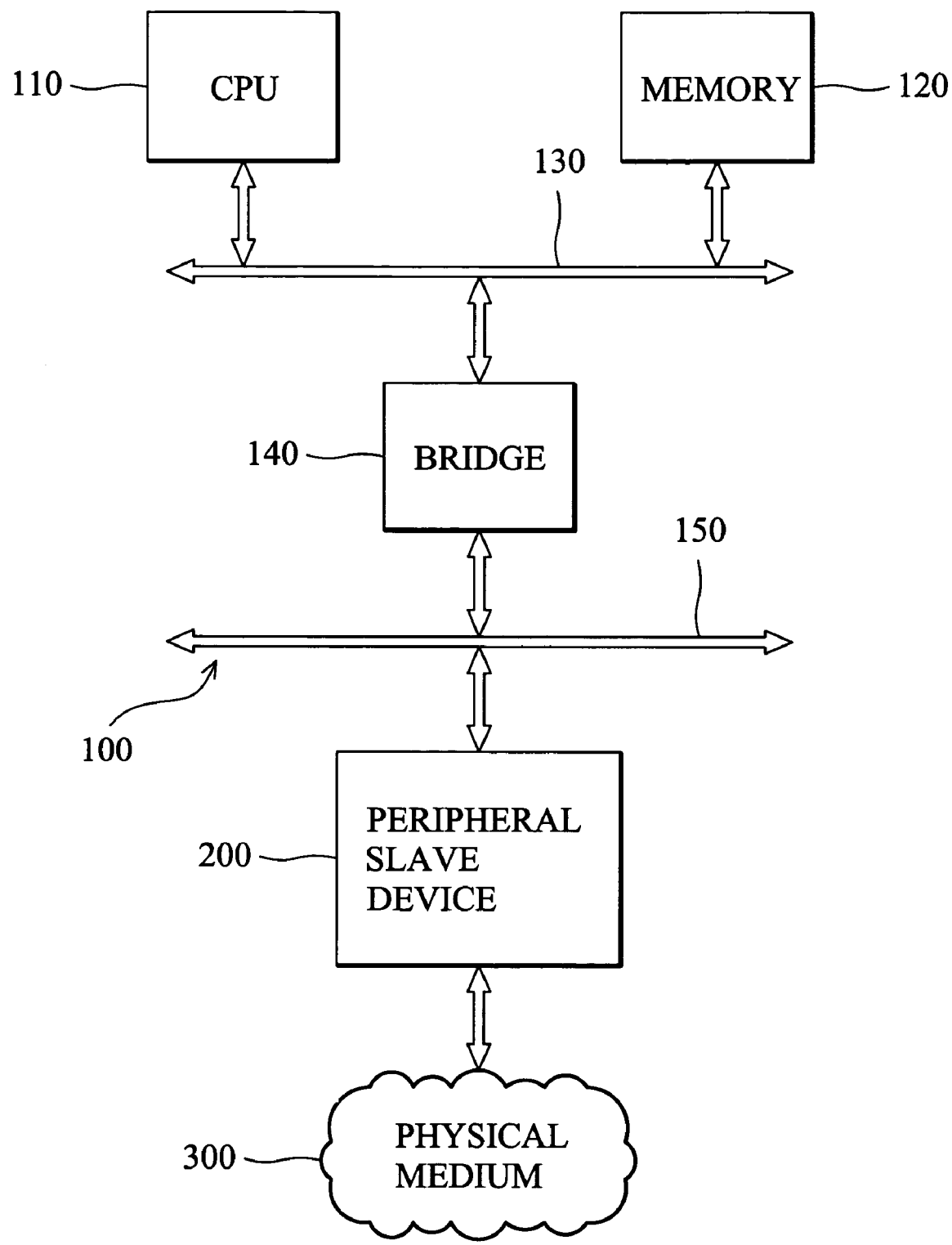
FIG. 1 is a simplified block diagram of an exemplary QoS communication system.

FIG. 1 is a simplified block diagram of an exemplary QoS communication system for transferring data to or from a physical medium 300. A host computer 100 comprises a central processing unit (CPU) 110 and system memory 120 coupled by a system bus 130; it may host application processes. The system memory 120 may be any combination of random access memory (RAM) or non-volatile memory devices (e.g. hard disk or flash memory). However, this is merely an example of a host system and embodiments of the present invention are not limited in this respect. A peripheral slave device 200 is coupled to communicate with the physical medium 300. The physical medium 300 may be any one of several media suitable for data transmission according to a communication protocol, including, for example, coaxial cabling, twisted pair lines, optical fiber cabling, or a wireless medium. The peripheral device 200 is coupled to the system bus 130 through a peripheral bus 150 and bridge 140. The term "bridge" refers to a device that connects multiple buses together. In one embodiment, the peripheral device 200 is a bus slave device from the standpoint of the host computer 100. The peripheral bus 150 may be an expansion bus or universal serial bus (USB). These are merely examples of the bus 150 and embodiments of the present invention are not limited in this respect. According to an embodiment, processes hosted on the CPU 110 and memory 120 may forward data to the peripheral device 200 for transmission through the physical medium 300. Similarly, the peripheral device 200 may receive data from the physical medium 300 for transmission to the CPU 110 and memory 120 as input to processes hosted thereon.

Figure 2:
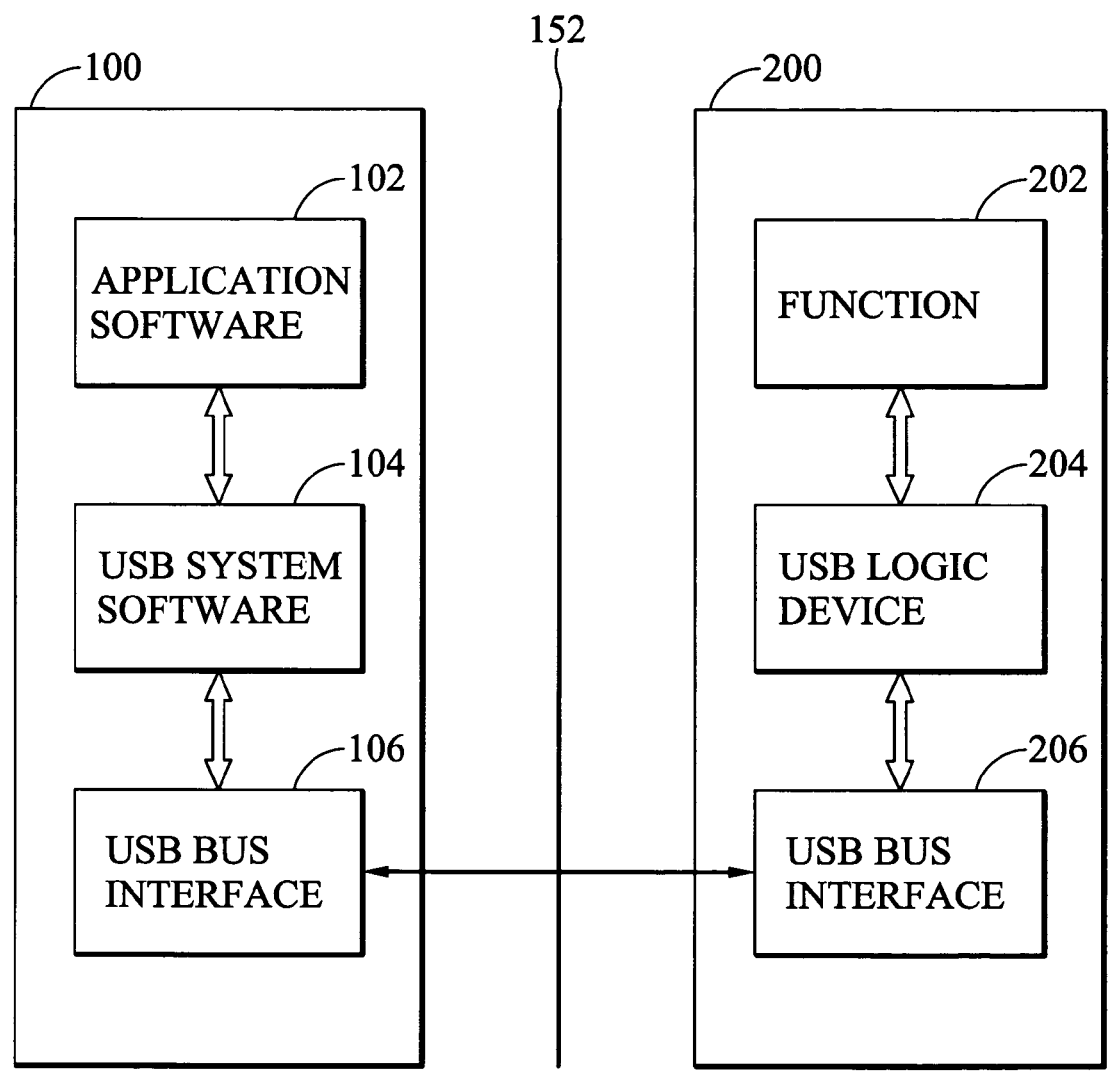
FIG. 2 is a block diagram illustrating logic composition of a USB host and device.

In one embodiment, the host computer 100 and the peripheral slave device 200 are both compliant with the Universal Serial Bus (USB) Specification, Revision 2.0. It should be understood to those skilled in the art that other bus systems with similar nature are contemplated to replace the USB in accordance with the principles of the invention. To help in understanding the invention, FIG. 2 illustrates logic composition of a USB host and device. USB systems are generally defined in terms of interconnects, devices, and hosts. Note that the host computer 100 of FIG. 1 serves as the USB host and the peripheral device 200 of FIG. 1 is regarded as a USB physical device. As shown in FIG. 2, the USB interconnect 152 defines the manner in which the USB devices are connected to and communicate with the host. Physically, the USB interconnect conforms to a tiered star topology. As to the USB host, the logic composition includes application software 102, USB system software 104, and host side USB bus interface 106. Application software 102 indicates software that executes on the host, corresponding to the USB device 200. The system software 104 supports the USB in a particular operating system. The USB interface 106 to the host computer system is referred to as the Host Controller. The Host Controller may be implemented in a combination of hardware, firmware, or software.

With continued reference to FIG. 2, the USB device's logic composition includes function 202, USB logic device 204, and USB bus interface 206. The function 202 comprises capabilities provided by the USB physical device, e.g., a mouse or WLAN connection. The USB logical device 204 appears to the USB system as a collection of endpoints and handles routing data between the bus interface and various endpoints on the device. An endpoint is a uniquely addressable entity of a USB device. Each logical device has a unique address assigned by the system at device attachment time. Each endpoint on a device is given at design time a unique device-determined identifier called the endpoint number, and has a device-determined direction of data flow. The combination of the device address, endpoint number, and direction allows each endpoint to be uniquely referenced. Each endpoint is a simplex connection that supports data flow in one direction: either input (from device to host) or output (from host to device). The application software requests that data be moved across the USB between a buffer on the host 100 and an endpoint on the USB device 200. The bottom layer of the USB device 200 is the bus interface 206 that transmits and receives packets. Furthermore, the USB device 200 connects to the host computer 100 through a physical USB wire 160. Double-headed thick arrows in FIG. 2 indicate actual communication flows across various interface boundaries.

The USB Specification defines four transfer types, one of which is the bulk transfer. The bulk transfer type is designed to support devices requiring communication of relatively large amounts of data at highly variable times where the transfer can use any available bandwidth. Bulk transfers occur only on a bandwidth-available basis. In addition, bulk transfers preferably attempt re-transmission in the case of delivery failure. An endpoint for bulk transfers specifies the maximum data payload size that the endpoint can accept from or transmit to the bus. This maximum applies to the data payloads of data packets; i.e., the size specified is for the data field of the packet not including other protocol-required information. The bulk endpoint is designed to support a maximum data payload size. The USB does not require that data payloads transmitted be exactly the maximum size. In other words, if a data payload is less than the maximum, it does not need to be padded to the maximum size. Throughout the description of the present invention, the term "data packet" shall be understood to include any grouping of one or more data elements of any size, including data cells, data bytes, and the like. USB bus transactions including data transfers generally involve the transmission of three types of packets: token, data, and handshake. The token packet is packet that identifies what transaction is to be performed on the bus. For example, a PING token is a query packet that probes a bulk endpoint on the USB device; an OUT token indicates that the host is about to transmit data packets to an endpoint. A data packet includes a data field which may range from zero to numerous bytes and must be in integral numbers of bytes. The handshake packet is used to acknowledge or reject a specific condition. There are, in part, following types of handshake packets: ACK, NAK, and NYET. For a PING or OUT transaction, an ACK handshake indicates a positive acknowledgement and a NAK handshake indicates a negative acknowledgement. Especially for a high-speed bulk OUT endpoint, a NYET handshake indicates that the endpoint accepted the data in the previous OUT transaction but does not have sufficient space for another data payload of maximum packet size.

Figure 3:
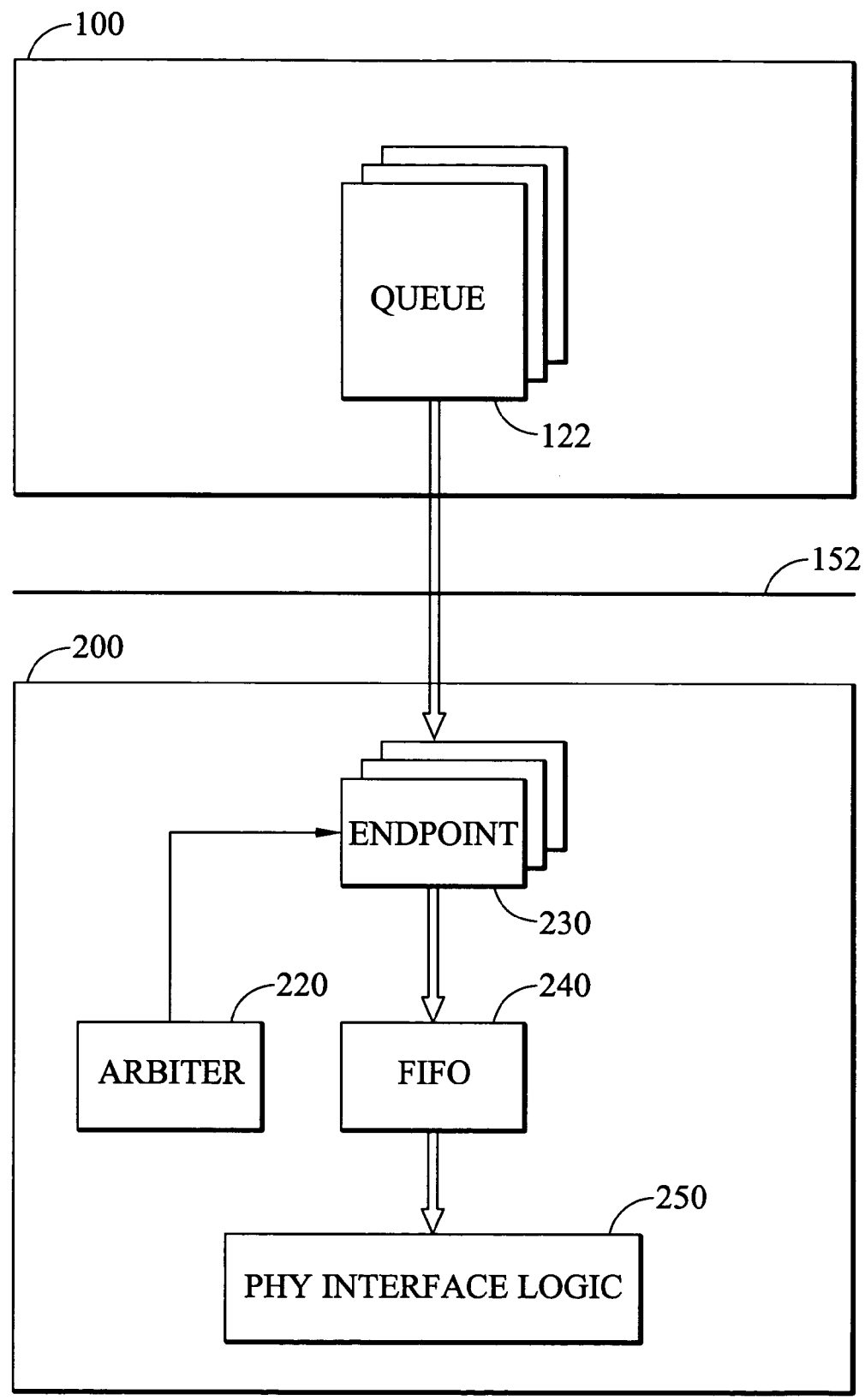
FIG. 3 is a block diagram of a peripheral slave device transferring data packets from a host computer with multiple queues according to an embodiment of the invention.

The present invention is now described in detail with reference to FIG. 3. As mentioned earlier, the peripheral device 200 is connected to and communicates with the host computer 100 through the USB interconnect 152. A portion of the host computer's resources, such as the system memory 120, are allocated to multiple queues. In one embodiment, the memory 120 includes a plurality of queues 122, each of which is associated with a particular QoS and configured to store data packets to be transmitted. The peripheral device 200 comprises an arbiter 220, a plurality of addressable entities 230, and a first-in-first-out (FIFO) buffer 240. The arbiter 220 determines which queue within the system memory 120 is to be served next in accordance with the QoS policy. The addressable entities 230 are USB endpoints for bulk OUT transfers. Each of the endpoints 230 is mapped to a corresponding queue on the host computer 100 and, if granted by the arbiter 220, accepts data packets over the USB bus from that queue. The FIFO buffer 240 is responsible for storing and managing the data packets from the endpoints 230 in a first-in-first-out manner. Further, the peripheral device 200 utilizes physical layer interface logic 250, coupled to the FIFO buffer 240 and accepting the data packets therefrom, to prepare the data packets for transmission on the physical medium 300. Note that the arbiter 220, endpoints 230, FIFO buffer 240 and physical layer interface logic 250 may be implemented with any combination of logic in an application specific integrated circuit (ASIC) or firmware.

When attempting to transmit data, the host computer 100 first polls each of the endpoints 230 by issuing a PING token. Depending on the queue determined to be served at this time, the arbiter 220 can grant the corresponding endpoint access to the USB bus, causing the granted endpoint to respond to the host computer's polling with an ACK handshake. The other endpoints, not granted by the arbiter 220, individually respond to the host computer's polling with a NAK handshake. Thus, the host computer 100 initiates one or more OUT transactions to transfer data packets from the determined queue to the corresponding endpoint that responds to the PING with the ACK. The granted endpoint responds to each OUT transaction with an ACK handshake when it accepts the data successfully and has space for another OUT transaction. If the granted endpoint responds to one OUT transaction with a NYET handshake, this indicates that the endpoint has accepted the data but does not have space for another OUT transaction. However, the granted endpoint may also respond to one transaction with a NAK handshake, meaning that the endpoint has not accepted the data and does not have sufficient space for the OUT transaction at this time. In both cases, the host computer 100 must return to using a PING token until one of the endpoints 230 responds with an ACK handshake.

In view of the above, the present invention discloses a bus slave device, such as a USB network adapter, having the ability to guarantee QoS in communication without use of DMA transfers. On a polling basis, the present invention provides a solution to guarantee QoS over USB, or the like.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A polling-based communication system comprising:
   a host computer comprising a system memory and a peripheral bus, the system memory comprising a plurality of queues, each configured to store data packets to be transmitted; and
   a peripheral slave device, connected to the host computer through the peripheral bus, comprising:
      an arbiter determining which queue is to be served next in accordance with a quality of service policy;
      a plurality of addressable entities, each corresponding to one of the queues within the system memory and, if granted, accepting the data packets over the peripheral bus from the corresponding queue; and
      a FIFO buffer storing the data packets fed by the addressable entities;
   wherein the host computer polls each addressable entity on the peripheral slave device by issuing a query packet, and initiates one or more transactions to transfer the data packets from one of the queues to the corresponding addressable entity that responds with an acknowledgement packet;
   wherein the arbiter, depending on the queue determined to be served next, grants the corresponding addressable entity access to the peripheral bus, causing the granted addressable entity to respond to the host computer's polling with the acknowledgement packet.

2. The system as recited in claim 1, wherein the other addressable entities, not granted by the arbiter, individually respond to the host computer's polling with a negative acknowledgement packet.

3. The system as recited in claim 1, wherein the peripheral slave device utilizes physical layer interface logic, coupled to the FIFO buffer and accepting the data packets therefrom, to prepare the data packets for transmission across a physical medium.

4. The system as recited in claim 1, wherein the host computer and the peripheral slave device are both compliant with the Universal Serial Bus (USB) Specification, Revision 2.0.

5. The system as recited in claim 4, wherein the peripheral bus is a USB bus and each of the addressable entities on the peripheral slave device is a USB endpoint for high-speed bulk OUT transfers.

6. The system as recited in claim 5, wherein the transactions initiated by the host computer to transfer the data packets out of the queues are OUT transactions of a bulk type.

7. The system as recited in claim 6, wherein the query packet is a PING token packet and the acknowledgement packet is an ACK handshake packet.

8. The system as recited in claim 7, wherein the USB endpoint granted by the arbiter can respond to each OUT transaction with the ACK handshake packet when the granted USB endpoint accepts the data successfully and has space for another OUT transaction.

9. The system as recited in claim 7, wherein the USB endpoint granted by the arbiter can respond to one OUT transaction with a NYET handshake packet when the granted USB endpoint accepts the data successfully but does not have space for another OUT transaction.

10. The system as recited in claim 7, wherein the USB endpoint granted by the arbiter can respond to one OUT transaction with a NAK handshake packet when the granted USB endpoint has not accepted the data and does not have sufficient space for the OUT transaction at this time.

11. The system as recited in claim 7, wherein the host computer returns to using the PING token packet when the USB endpoint granted by the arbiter does not respond to one OUT transaction with the ACK handshake.

12. A polling-based communication apparatus by serving multiple queues in a host system without using direct memory access, comprising:
  an arbiter determining which queue is to be served next in accordance with a quality of service policy;
  a plurality of addressable entities, each corresponding to one of the queues maintained in the host system and, if granted, accepting data packets through a peripheral bus from the corresponding queue; and
  a FIFO buffer storing the data packets fed by the addressable entities;
  wherein each addressable entity is polled with a query packet from the host system, and one of the addressable entities that responds with an acknowledgement packet is fed with the data packets from the corresponding queue by one or more transactions over the peripheral bus;
  wherein the arbiter, depending on the queue determined to be served next, grants the corresponding addressable entity access to the peripheral bus, causing the granted addressable entity to respond to the host system's polling with the acknowledgement packet.

13. The apparatus as recited in claim 12, wherein the other addressable entities, not granted by the arbiter, individually respond to the host system's polling with a negative acknowledgement packet.

14. The apparatus as recited in claim 12, further comprising physical layer interface logic, coupled to the FIFO buffer and accepting the data packets therefrom, to prepare the data packets for transmission across a physical medium.

15. The apparatus as recited in claim 12, wherein the apparatus is compliant with the Universal Serial Bus (USB) Specification, Revision 2.0, the peripheral bus is a USB bus, and each of the addressable entities is a USB endpoint for high-speed bulk OUT transfers.

16. The apparatus as recited in claim 15, wherein the transactions transferring the data packets out of the queues are OUT transactions of a bulk type.

17. The apparatus as recited in claim 15, wherein the query packet is a PING token packet and the acknowledgement packet is an ACK handshake packet.

* * * * *